(12) United States Patent
Sugawara

(10) Patent No.: US 10,121,371 B2
(45) Date of Patent: Nov. 6, 2018

(54) DRIVING ASSISTANCE DEVICE, AND DRIVING ASSISTANCE METHOD

(71) Applicant: MITSUBISHI ELECTRIC CORPORATION, Tokyo (JP)

(72) Inventor: Hisashi Sugawara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 81 days.

(21) Appl. No.: 15/301,825

(22) PCT Filed: Apr. 15, 2014

(86) PCT No.: PCT/JP2014/060708
§ 371 (c)(1),
(2) Date: Oct. 4, 2016

(87) PCT Pub. No.: WO2015/159362
PCT Pub. Date: Oct. 22, 2015

(65) Prior Publication Data
US 2017/0116854 A1    Apr. 27, 2017

(51) Int. Cl.
G08G 1/09 (2006.01)
G08G 1/0962 (2006.01)
B60W 40/105 (2012.01)
G08G 1/01 (2006.01)
G08G 1/052 (2006.01)
(Continued)

(52) U.S. Cl.
CPC ....... G08G 1/09623 (2013.01); B60W 40/105 (2013.01); G01C 21/3492 (2013.01); G08G 1/0112 (2013.01); G08G 1/0129 (2013.01); G08G 1/0133 (2013.01); G08G 1/0141 (2013.01); G08G 1/0145 (2013.01); G08G 1/052 (2013.01); G08G 1/09675 (2013.01); G08G 1/096716 (2013.01); G08G 1/096775 (2013.01)

(58) Field of Classification Search
CPC ............ G08G 1/09623; G08G 1/0965; G08G 1/0967; G08G 1/096716; G08G 1/096725; G01C 21/3492
See application file for complete search history.

(56) References Cited

U.S. PATENT DOCUMENTS

| | | | | |
|---|---|---|---|---|
| 8,532,862 B2* | 9/2013 | Neff | ...................... | G05D 1/0231 701/25 |
| 8,700,299 B2* | 4/2014 | Morita | ............. | G08G 1/096716 701/123 |
| 9,666,069 B2* | 5/2017 | Engelman | .............. | G08G 1/091 |

(Continued)

FOREIGN PATENT DOCUMENTS

| JP | 2008-087545 A | 4/2008 |
|---|---|---|
| JP | 2008-242843 A | 10/2008 |

(Continued)

Primary Examiner — Nicholas Kiswanto
(74) Attorney, Agent, or Firm — Birch, Stewart, Kolasch & Birch, LLP

(57) ABSTRACT

A travel pattern communication unit 15 receives a low fuel consumption travel pattern of a preceding vehicle of an own vehicle from a server device 200. A travel pattern correction unit 17 corrects a reference travel pattern of the own vehicle generated by a travel pattern generation unit 16 based on the low fuel consumption travel pattern of the preceding vehicle received by the travel pattern communication unit 15.

13 Claims, 12 Drawing Sheets

(51) Int. Cl.
*G08G 1/0967* (2006.01)
*G01C 21/34* (2006.01)

(56) References Cited

U.S. PATENT DOCUMENTS

| | | | |
|---|---|---|---|
| 2010/0204870 A1* | 8/2010 | Saeki | B60W 30/17 |
| | | | 701/31.4 |
| 2012/0109510 A1 | 5/2012 | Ota et al. | |
| 2013/0013164 A1 | 1/2013 | Taguchi | |
| 2013/0158838 A1* | 6/2013 | Yorke | B60W 10/06 |
| | | | 701/103 |
| 2014/0067225 A1* | 3/2014 | Lee | B60W 50/0097 |
| | | | 701/93 |
| 2017/0043776 A1* | 2/2017 | Sujan | B60W 30/188 |

FOREIGN PATENT DOCUMENTS

| | | |
|---|---|---|
| JP | 2011-186953 A | 9/2011 |
| JP | 2012-022565 A | 2/2012 |
| WO | WO 2011/036855 A1 | 3/2011 |
| WO | WO 2011/101949 A1 | 8/2011 |

\* cited by examiner

| Deceleration Start Speed [km/h] | Deceleration [m/sec²] |
|---|---|
| ~ | ~ |
| 40 | 1.28 |
| 45 | 1.30 |
| 50 | 1.34 |
| 55 | 1.64 |
| 60 | 1.92 |
| ~ | ~ |

FIG.8
(a)
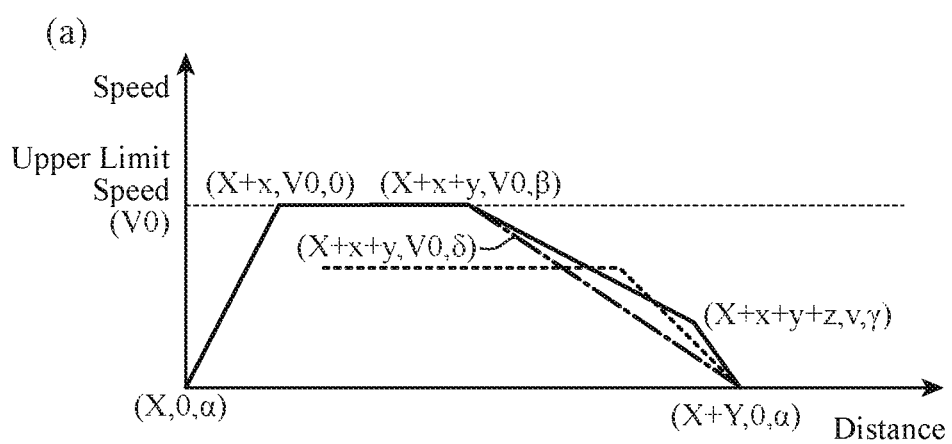
(b)
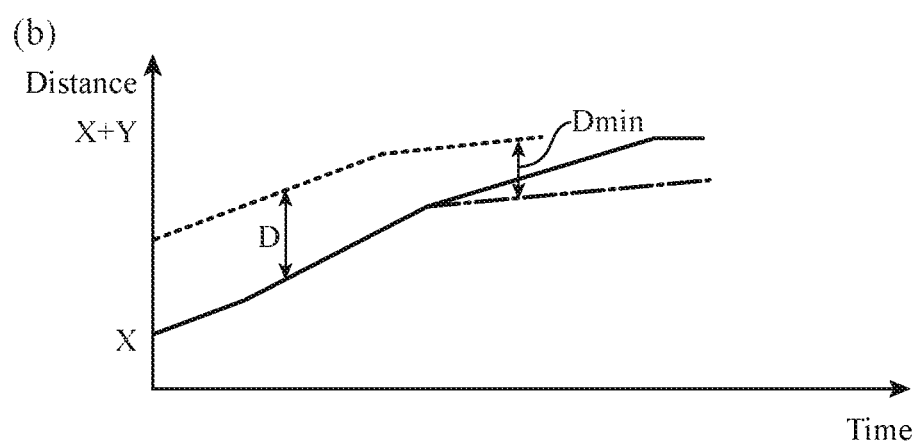

DRIVING ASSISTANCE DEVICE, AND DRIVING ASSISTANCE METHOD

TECHNICAL FIELD

The present invention relates to a driving assistance device and a driving assistance method to calculate a travel pattern of an own vehicle based on information exchanged with a server device.

BACKGROUND ART

In the related art, there is an invented technology in which a vehicle currently travelling on a road receives signal information indicating timing of signal switching from a traffic signal installed in an intersection located ahead of an advancing direction via road-to-vehicle communication, and various kinds of driving assistance are performed based on the received signal information such that the vehicle can smoothly pass the intersection.

However, at the time of intending to pass the intersection without stop by providing travel speed information based on the signal information or by executing vehicle control, appropriate driving assistance may be hardly performed because of other vehicles existing around the own vehicle.

Therefore, for example, there exists an on-vehicle driving assistance device in which current situations are determined by acquiring surrounding vehicle information such as existence, a speed, a position, and an advancing direction of other vehicles from a radar/camera or vehicle-to-vehicle communication, thereby determining content of driving assistance until the vehicle passes an intersection from a current position (refer to Patent Document 1, for example).

Furthermore, there exists a vehicle control device that performs control by acquiring average deceleration of a preceding vehicle at the time of signal stop in the case of detecting the preceding vehicle, comparing the acquired average deceleration with an average deceleration of an own vehicle operated by a driver, and setting a speed pattern of the own vehicle in accordance with the smaller average deceleration obtained from the comparison (refer to Patent Document 2, for example).

CITATION LIST

Patent Documents

Patent Document 1: JP 2012-22565 A
Patent Document 2: WO 2011/101949

SUMMARY OF THE INVENTION

Problems to be Solved by the Invention

However, in an on-vehicle driving assistance device of Patent Document 1, a speed of an own vehicle is adjusted after detecting a preceding vehicle by a radar/camera and the like. Therefore, in the case where the preceding vehicle rapidly accelerates or decelerates, there may be a problem in which the own vehicle cannot smoothly decelerate and fuel consumption is increased. Additionally, in a vehicle control device of Patent Document 2, a speed pattern of an own vehicle is generated by using average deceleration of a preceding vehicle detected by a radar/camera and the like. However, since the average deceleration is needed to be calculated by capturing the preceding vehicle for a predetermined time by the radar/camera and the like, there may be a problem in which a certain period is needed to generate the speed pattern.

The present invention is made to solve the above-described problems and directed to enabling driving assistance in accordance with situations of surrounding vehicles, and improving fuel consumption.

Means for Solving the Problems

A driving assistance device according to the present invention includes: a traffic situation detector to acquire signal information representing indication schedule of a traffic signal; a vehicle information detector to acquire at least a speed of an own vehicle as vehicle information; a current position specifier to acquire a current position of the own vehicle as current positional information; a travel route specifier to acquire, as travel route information, a spot where deceleration is required on a planned travel route along which the own vehicle travels; a history information storage to store, as history information, the vehicle information correlated to the current positional information; a travel pattern generator to generate a travel pattern by acquiring a recommended speed when the own vehicle travels along the travel route based on the signal information, vehicle information, current positional information, travel route information, and history information; a travel pattern communicator to transmit the travel pattern of the own vehicle generated by the travel pattern generator and receive a travel pattern of a preceding vehicle of the own vehicle by communicating with a server device; a travel pattern corrector to correct the travel pattern of the own vehicle generated by the travel pattern generator based on the travel pattern of the preceding vehicle received by the travel pattern communicator from the server device; and an information provider to provide the own vehicle with the travel pattern of the own vehicle generated by the travel pattern generator or corrected by the travel pattern corrector.

A driving assistance method according to the present invention includes: a travel pattern generation step performed by a travel pattern generator to acquire a recommended speed when an own vehicle travels along a travel route, and generates a travel pattern; a travel pattern communication step performed by a travel pattern communicator to transmit the travel pattern of the own vehicle generated in the travel pattern generation step and receive a travel pattern of a preceding vehicle of the own vehicle by communicating with a server device; a travel pattern correction step performed by a travel pattern corrector to correct the travel pattern of the own vehicle generated in the travel pattern generation step based on the travel pattern of the preceding vehicle received from the server device in the travel pattern communication step; and an information providing step performed by an information provider to provide the own vehicle with the travel pattern of the own vehicle generated in the travel pattern generation step or corrected in the travel pattern correction step.

Effect of the Invention

According to the present invention, since the travel pattern of the own vehicle is adapted to be corrected based on the travel pattern of the preceding vehicle received from the server device, driving assistance in accordance with situations of surrounding vehicles can be provided, and fuel consumption can be improved.

BRIEF DESCRIPTION OF THE DRAWINGS

FIGS. 8(a) and 8(b) are graphs illustrating another exemplary reference travel pattern correction processing of the driving assistance device according to the first embodiment.

MODES FOR CARRYING OUT THE INVENTION

In the following, embodiments to carry out the present invention will be described in accordance with the attached drawings in order to describe the present invention more in detail.

First Embodiment

Figures 1, 2:
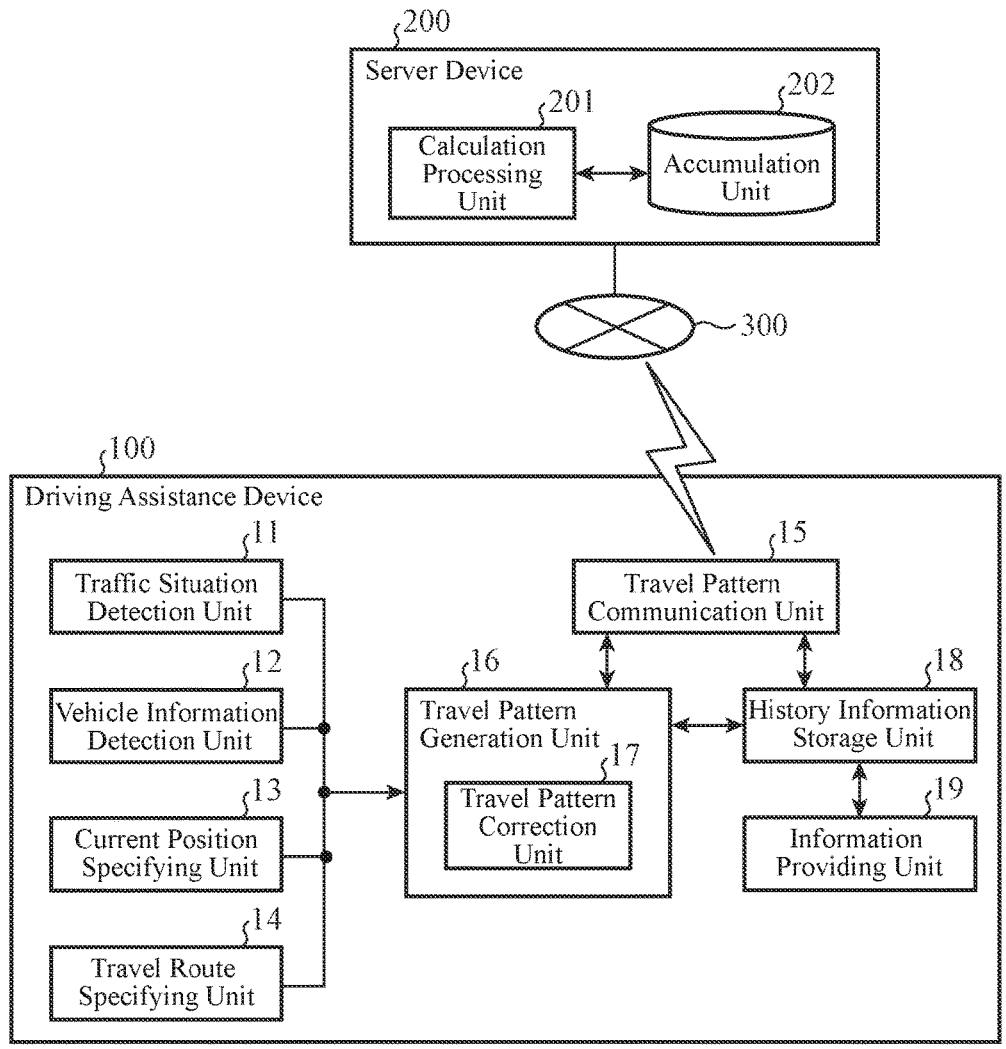
FIG. 1 is a block diagram illustrating a driving assistance system including a driving assistance device according to a first embodiment of the present invention.
FIG. 2 is a table illustrating exemplary deceleration stored in the driving assistance device according to the first embodiment.

As illustrated in FIG. 1, a driving assistance device 100 according to a first embodiment is connected to a server device 200 via a mobile communication network 300. The driving assistance device 100 is mounted on an engine drive vehicle, a hybrid vehicle, or an electric vehicle (hereinafter referred to as a vehicle) and generates a low fuel consumption travel pattern for a planned travel route along which an own vehicle travels based on traffic situation information, travel route information, a travel pattern of another vehicle, and the like. As illustrated in FIG. 1, the driving assistance device 100 includes a traffic situation detection unit 11, a vehicle information detection unit 12, a current position specifying unit 13, a travel route specifying unit 14, a travel pattern communication unit 15, a travel pattern generation unit 16, a travel pattern correction unit 17, a history information storage unit 18, and an information providing unit 19.

The traffic situation detection unit 11 acquires surrounding situations as traffic situation information, such as signal information representing a signal indication schedule of a traffic signal, traffic jam state information, information of a tail end position in a line of vehicles waiting for a signal (tail end position of a signal waiting line), and information of other vehicles existing near the vehicle mounted with the driving assistance device 100, and outputs the acquired information to the travel pattern generation unit 16. The traffic situation detection unit 11 may also acquire the traffic situation information by communicating with other vehicles, a road side device, or a server. Further, the traffic situation detection unit 11 may also generate the traffic situation information based on information detected by various kinds of sensors such as millimeter-wave sensors, ultrasonic sensors, or image sensors mounted on a vehicle. Additionally, the traffic situation detection unit 11 may generate the traffic situation information also by predicting the indication schedule by using relative time of signal information of each of traffic signals existing on the same route obtained from past travel history of the own vehicle. Acquisition of the traffic situation information by the traffic situation detection unit 11 is repeatedly performed at predetermined timing. Output of the traffic situation information from the traffic situation detection unit 11 to the travel pattern generation unit 16 is performed in the case of acquiring the traffic situation information, in the case where there is a change in an acquired result of the traffic situation information, or in the case of receiving a request from the travel pattern generation unit 16.

The vehicle information detection unit 12 acquires, from various kinds of sensors mounted on the vehicle, a gyroscope, or the like, current vehicle information of the own vehicle such as a speed, acceleration, a fuel injection amount, and an operation amount of an accelerator or a brake pedal, and outputs the acquired information to the travel pattern generation unit 16. The vehicle information detection unit 12 continuously repeats acquisition and output of the vehicle information at predetermined timing.

The current position specifying unit 13 specifies a current position where the own vehicle exists by performing mapping processing with map information utilizing a global positioning system (GPS) or a gyroscope, and outputs the same to the travel pattern generation unit 16 as current positional information. The current position specifying unit 13 continuously repeats acquisition and output of the current positional information at predetermined timing.

The travel route specifying unit 14 specifies a planned travel route along which the own vehicle travels, generates the travel route information, and outputs the same to the travel pattern generation unit 16. The travel route specifying unit 14 may also specify as the travel route, for example, a guide route to a destination set by a user. Furthermore, the travel route specifying unit 14 may also specify, as the travel route, a route along which the vehicle has frequently traveled in the past, including a current position. Additionally, the travel route specifying unit 14 may also specify, as the travel route, a route predicted from the current position and an advancing direction; for example, in the case where a road during traveling is an arterial road, the arterial road may be specified as a travel route. Specifying of the travel route by the travel route specifying unit 14 is performed not only at predetermined travel timing but also at the time of starting travel, when the guide route is set or changed, or when the own vehicle deviates from the travel route previously specified.

The travel route information includes information of places (intersections, curved roads, etc.) where deceleration is required on a planned travel route along which the own vehicle travels. The places where deceleration is required is determined based on information such as information of intersections, a route length, a speed limit, number of traffic lanes, signal position information, curve information, and existence of left/right turn.

The travel pattern communication unit 15 transmits, to the server device 200, a low fuel consumption travel pattern generated by the travel pattern generation unit 16 or the travel pattern correction unit 17 via the mobile communication network 300, and receives a low fuel consumption travel pattern of another vehicle from the server device 200. Communication with the server device 200 is implemented by wireless communication with the mobile communication network 300 such as 3G or long term evolution (LTE). Transmission of the low fuel consumption travel pattern by the travel pattern communication unit 15 is performed basically when the travel pattern generation unit 16 generates a reference travel pattern serving as a base of the low fuel consumption travel pattern and when the travel pattern correction unit 17 obtains a low fuel consumption travel pattern by correcting the reference travel pattern. Furthermore, receipt of the low fuel consumption travel pattern by the travel pattern communication unit 15 is performed basically when the traffic situation detection unit 11 acquires the traffic situation information (signal information) or when push notification (request) is made by the server device 200.

Using the traffic situation information, vehicle information, current positional information, and travel route information acquired from the traffic situation detection unit 11, vehicle information detection unit 12, current position specifying unit 13, and travel route specifying unit 14, the travel pattern generation unit 16 acquires a recommended speed at the time of traveling the travel route on which the current position of the own vehicle is set as a start point, to generate a travel pattern. In the following, this travel pattern will be referred to as a reference travel pattern. The reference travel pattern is a model travel pattern in the case where a driver drives in such a way as to reduce energy consumption in consideration of a traffic jam state on a road, a speed limit, an indication schedule of a traffic signal, travel features in each travel section.

In the case where the travel pattern communication unit 15 acquires low fuel consumption travel pattern information of another vehicle from the server device 200, the travel pattern correction unit 17 compares the acquired low fuel consumption travel pattern information with the reference travel pattern of the own vehicle generated by the travel pattern generation unit 16, and determines whether an inter-vehicle distance or an inter-vehicle time between the own vehicle and another vehicle can be kept at a threshold or longer, and then if necessary, modifies the reference travel pattern of the own vehicle.

The history information storage unit 18 preliminarily stores, for example, the reference travel pattern that has been generated by the travel pattern generation unit 16 till now or the reference travel pattern corrected by the travel pattern correction unit 17, and also stores various kinds of parameters such as driving characteristics of an actual driver till now (speed, acceleration, deceleration) and the threshold of the inter-vehicle distance (inter-vehicle distance Dmin described later), and provides information in accordance with a request from the travel pattern generation unit 16 or the travel pattern correction unit 17. The reference travel pattern stored in the history information storage unit 18 will be referred to as the low fuel consumption travel pattern.

Here, for example, a table in which acceleration values are defined for respective acceleration end speeds and a table in which deceleration values are defined for respective deceleration start speeds are prepared. An initial value of the deceleration is set to a fixed value adopting a value being as small as possible. In the case where deceleration measured by the vehicle information detection unit 12 can be acquired predetermined times or more, the initial value is replaced with an average value of the deceleration such that acceleration and deceleration reflecting the vehicle characteristics can be reflected on generation and correction of the reference travel pattern. FIG. 2 is a table illustrating exemplary setting for deceleration. In this regard, in FIG. 2, a setting of deceleration in the case of using only engine brake is illustrated; however, deceleration may also be set by utilizing both deceleration of the engine brake by turning off an accelerator and deceleration by foot brake. In this case, timing to reach a fuel injection reactivation speed of the engine is learned from history, and deceleration by engine brake and deceleration by foot brake may be switched on the way of deceleration.

Furthermore, as for the threshold of the inter-vehicle distance (inter-vehicle distance Dmin), for example, an inter-vehicle time is provided as a parameter, and a distance that a vehicle travels at its speed during inter-vehicle time is calculated as the inter-vehicle distance. In this regard, the inter-vehicle time adopts the time which the vehicle can safely follow even in the case where a surrounding vehicle is suddenly braked. However, in the case where a travel pattern calculated based on the speed of the own vehicle measured by the vehicle information detection unit 12 deviates from the reference travel pattern generated by the travel pattern generation unit 16, the history information storage unit 18 can change the inter-vehicle time in accordance with the driving characteristics of a driver.

For example, in the case where the speed can be acquired the predetermined times or more and the average value of the acquired speeds is faster than the speed suggested by the reference travel pattern, or in the case where the own vehicle and a surrounding vehicle are likely to come close to each other due to slow timing to turn off the accelerator, the history information storage unit 18 corrects the inter-vehicle time shorter. On the other hand, in the case where the average value of the acquired speeds is slower than the speed suggested by the reference travel pattern, or in the case where the own vehicle and the surrounding vehicle hardly come close to each other due to quick timing to turn off the accelerator, the history information storage unit 18 corrects the inter-vehicle time longer.

The information providing unit 19 provides information to an output unit, such as a display and a speaker, based on the low fuel consumption travel pattern stored in the history information storage unit 18, and assists a driver to perform low fuel consumption travel. For example, a recommended speed may be suggested or deceleration timing by using engine brake may be notified by a sound and an image. The information providing unit 19 may include an output unit, or may utilize an output unit mounted on the vehicle.

Meanwhile, in FIG. 1, described is the example in which the driving assistance device 100 provides information related to assistance for eco-driving (low fuel consumption travel) via the information providing unit 19 and the driver manually drives in accordance with the assistance. However, in the case of a vehicle mounted with an automatic driving function, a travel speed of an own vehicle can be automatically controlled based on a low fuel consumption travel pattern as well.

The server device 200 includes a calculation processing unit 201 and an accumulation unit 202. The calculation processing unit 201 receives information of the low fuel consumption travel pattern transmitted from the driving assistance device 100 mounted on each vehicle via the mobile communication network 300, and performs calculation processing based on content thereof. Additionally, the calculation processing unit 201 performs calculation processing to estimate traveling situation of the vehicle based on the information of the low fuel consumption travel pattern transmitted from the driving assistance device 100 of any one of vehicles, and transmits the information of the low fuel consumption travel pattern according to a calculation result thereof to the driving assistance device 100 of a surrounding vehicle via the mobile communication network 300. Specific content of the calculation processing performed by the calculation processing unit 201 will be described later in detail.

The accumulation unit 202 accumulates various kinds of data necessary for the above calculation processing performed by the calculation processing unit 201, data related to the calculation processing result of the calculation processing unit 201, and so on. The data is read from the accumulation unit 202 or written in the accumulation unit 202 in accordance with necessity by control of the calculation processing unit 201.

Figure 3:
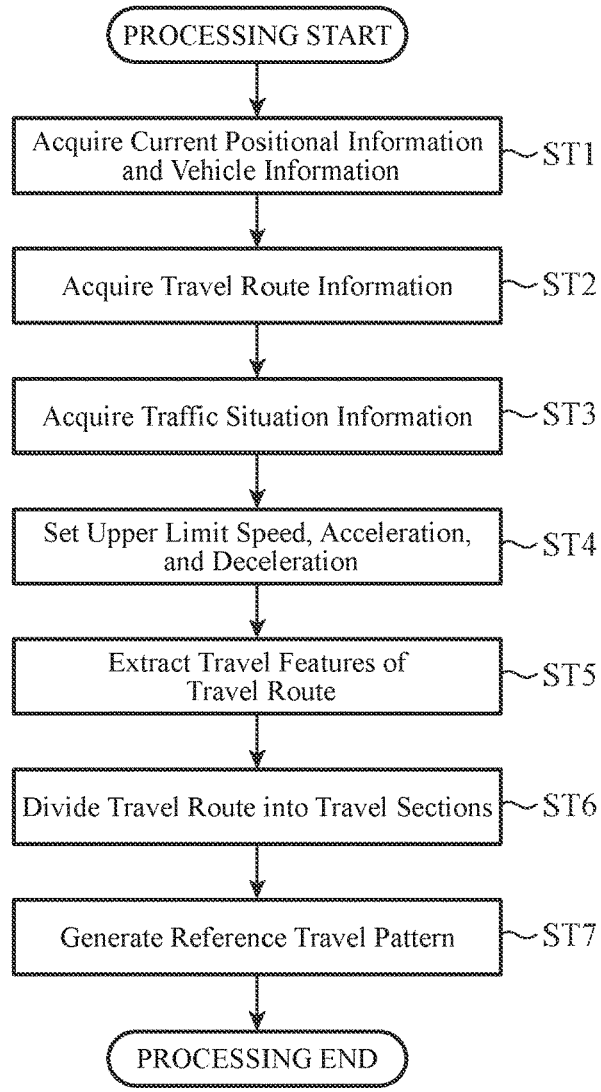
FIG. 3 is a flowchart illustrating exemplary reference travel pattern generation processing of the driving assistance device according to the first embodiment.

FIG. 3 is a flowchart illustrating exemplary operation of the driving assistance device 100 according to the first embodiment, and also illustrating exemplary reference travel pattern generation processing by the travel pattern generation unit 16. The reference travel pattern generation processing illustrated in FIG. 3 is executed at a predetermined timing after start of traveling. For example, the predetermined timing may be the timing to start guiding after setting the travel route, or every time of traveling a predetermined distance or for a predetermined time, or every time of entering a travel section on the travel route.

First, in Step ST1, the travel pattern generation unit 16 acquires the current positional information from the current position specifying unit 13, and acquires the vehicle information from the vehicle information detection unit 12.

Next, in Step ST2, the travel pattern generation unit 16 acquires, from travel route specifying unit 14, travel route information from the current position acquired in Step ST1 to a destination or travel route information of a certain distance.

Next, in Step ST3, the travel pattern generation unit 16 acquires, from the traffic situation detection unit 11, traffic situation information such as an indication schedule of a traffic signal existing in the travel route acquired in Step ST2 and traffic situations around the vehicle.

In Step ST4, the travel pattern generation unit 16 acquires acceleration and deceleration acquired from the history information storage unit 18 in addition to the travel route information and the traffic situation information acquired in Steps ST2, ST3, and sets an upper limit speed, acceleration, and deceleration in the reference travel pattern.

The upper limit speed is set per predetermined spot on the travel route (in addition to legal speed limit setting spot, specific spots on the travel route such as a curved spot and a left/right turn spot) based on, for example, a speed limit (legal speed limit) of the travel route, curve information, existence of left/right turn, traffic jam information, and the like.

In Step ST5, the travel pattern generation unit 16 extracts travel features on a planned travel route. The extracted travel features may be, for example, a distance of a travel section, an initial speed, a terminal speed, an average speed, a travel period, and the like.

In Step ST6, the travel pattern generation unit 16 divides the travel route into a plurality of travel sections based on the travel features extracted in Step ST5 and a position of a traffic signal. For example, the travel pattern generation unit 16 sets, as a reference point, a spot where a passing time is restricted in accordance with the traffic situation information of, for example, a case where another vehicle exists ahead due to position and indication of the traffic signal, and the travel pattern generation unit 16 divides the travel route based on the set reference point. Furthermore, besides the reference point set based on the traffic signal, a spot to start acceleration from a low speed having a specified value or lower (including 0 km/h) may be determined as the spot for a stop or deceleration due to existence of a stopped vehicle ahead, so that the spot is set as the reference spot. Also, a position of a traffic signal where the vehicle can pass without stopping at the signal position in accordance with indication schedule of the traffic signal may also be set as the reference point.

In Step ST7, the travel pattern generation unit 16 generates a reference travel pattern on the travel route acquired in Step ST2 based on the traffic situation information acquired in Step ST3, the upper limit speed and acceleration set in Step ST4, and the travel features extracted in Step ST5. In the reference travel pattern, a current vehicle position and speed acquired in Step ST1 are set as a start point. For example, in the case where the current speed of the vehicle is lower than the upper limit speed, the travel pattern generation unit 16 generates the reference travel pattern such that the speed is accelerated up to the upper limit speed with the acceleration set as described above and becomes constant at the upper limit speed. In the case where the current speed of the vehicle is higher than the upper limit speed, the reference travel pattern is generated such that the speed is decelerated at the deceleration set as above to avoid exceeding the upper limit speed. Meanwhile, generally in a gasoline engine, thermal efficiency is decreased and fuel consumption is deteriorated when driving is performed beyond a range of a load (torque) and a speed at which the thermal efficiency reaches a maximal value. Therefore, the reference travel pattern in which the above-described constant speed is kept using coast driving by turning off the accelerator may also be generated.

Moreover, in the case where the traffic signal indicates a red light when the vehicle is in the tail end position of a signal waiting line, or a stop position learned from the travel history, or when the vehicle reaches the signal position, the travel pattern generation unit 16 generates the reference travel pattern in which the vehicle is decelerated at the deceleration set as above so as to be stopped at the signal position.

Figure 4:
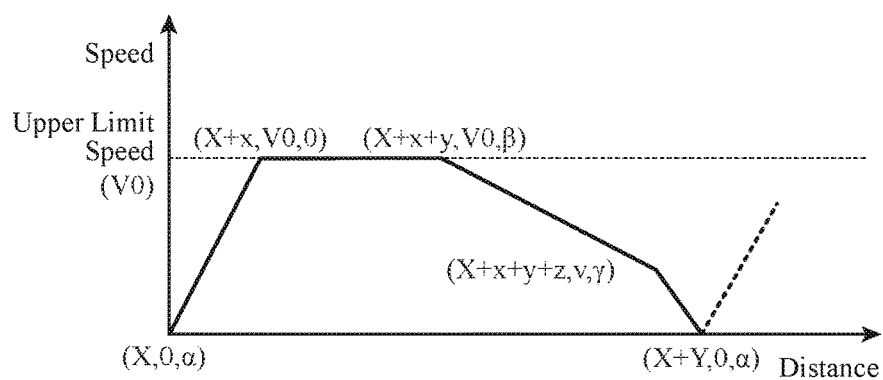
FIG. 4 is a graph illustrating an exemplary reference travel pattern generated by the driving assistance device according to the first embodiment.

In this case, when it is assumed that each section of the reference travel pattern is defined by (distance, speed, acceleration/deceleration), and the following are assumed: X, Y, x, y, and z each are the distance; v is the speed; $\alpha$ is the acceleration; and $\beta$ and $\gamma$ each are the deceleration, a graph of a travel pattern as illustrated in FIG. 4 is provided. In the graph of FIG. 4, a vertical axis represents the speed, a horizontal axis represents the distance, and inclination of a line represents the acceleration/deceleration, and the distance X is the current position and the distance Y is the signal stop position. In a section from the distance X to a distance X+x, the speed is accelerated from zero to the upper limit speed V0 at the acceleration α. In a section from the distance X+x to a distance X+x+y, the speed is kept constant at the upper limit speed V0. In a section from a distance the X+x+y to a distance X+x+y+z, the speed is decelerated from the upper limit speed V0 to the speed v at the deceleration β. In a section from the distance X+x+y+z to a distance X+Y, the speed is decelerated from the speed v to zero at the deceleration γ.

Figure 5:
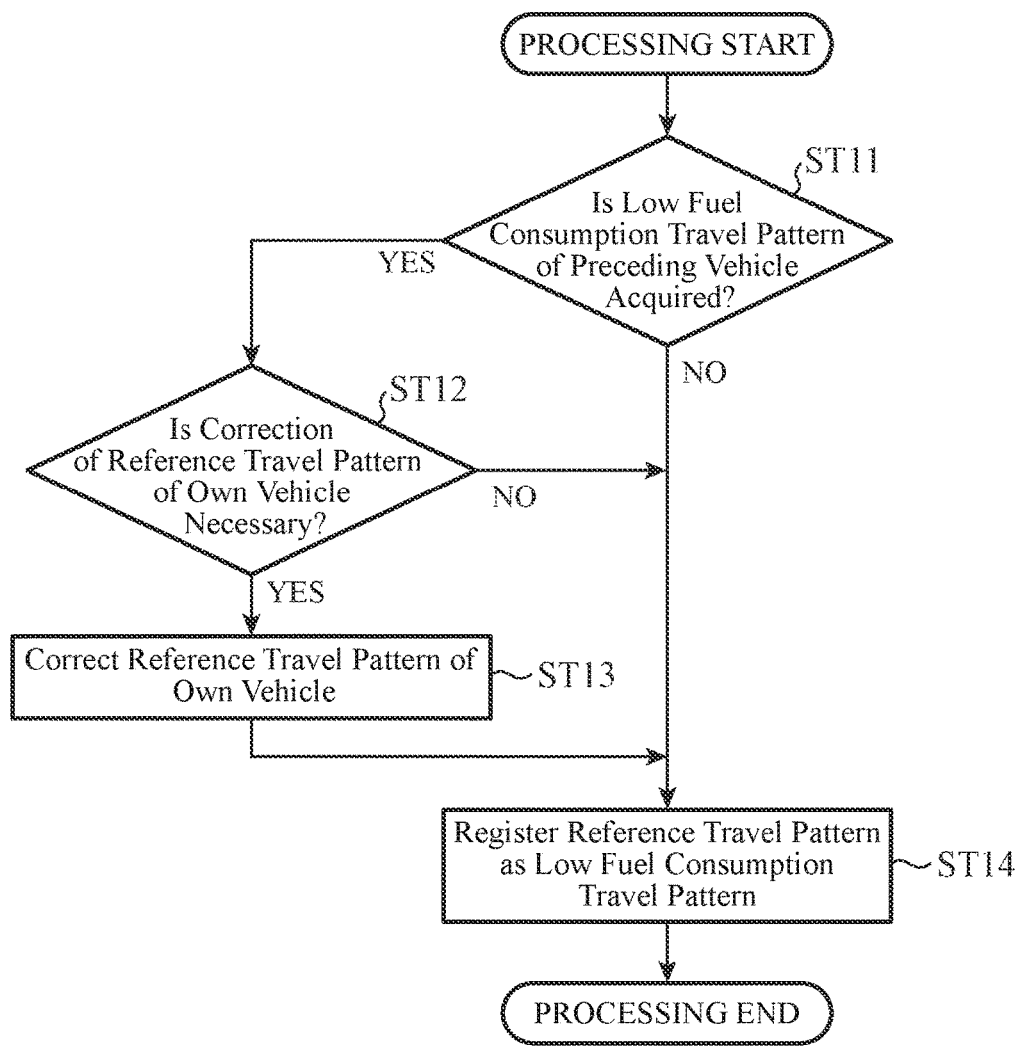
FIG. 5 is a flowchart illustrating exemplary reference travel pattern correction processing of the driving assistance device according to the first embodiment.

FIG. 5 is a flowchart illustrating exemplary operation of the driving assistance device 100 according to the first embodiment, and also illustrating reference travel pattern correction processing by the travel pattern correction unit 17. The reference travel pattern correction processing illustrated in FIG. 5 is performed at the timing same as the reference travel pattern generation processing, and is further repeatedly performed after the reference travel pattern generation processing. Furthermore, the reference travel pattern correction processing may also be performed at the timing when the travel pattern communication unit 15 receives a low fuel consumption travel pattern of a preceding vehicle from the server device 200.

First, in Step ST11, the travel pattern correction unit 17 confirms whether the low fuel consumption travel pattern of the preceding vehicle can be acquired from the travel pattern communication unit 15. In the case where the low fuel consumption travel pattern can be acquired (Step ST11: "YES"), the processing proceeds to Step ST12. On the other hand, in the case where the low fuel consumption travel pattern cannot be acquired (Step ST11: "NO"), the processing proceeds to Step ST14.

Next, in Step ST12, the travel pattern correction unit 17 examines, based on the low fuel consumption travel pattern of the preceding vehicle acquired in Step ST11, necessity of correction of the reference travel pattern already generated for the own vehicle is examined. More specifically, the travel pattern correction unit 17 acquires the threshold of the inter-vehicle distance (inter-vehicle distance Dmin) from the history information storage unit 18, and determines that correction is necessary in the case of determining that the inter-vehicle distance between the own vehicle and the preceding vehicle is shorter than the threshold.

Figure 6:
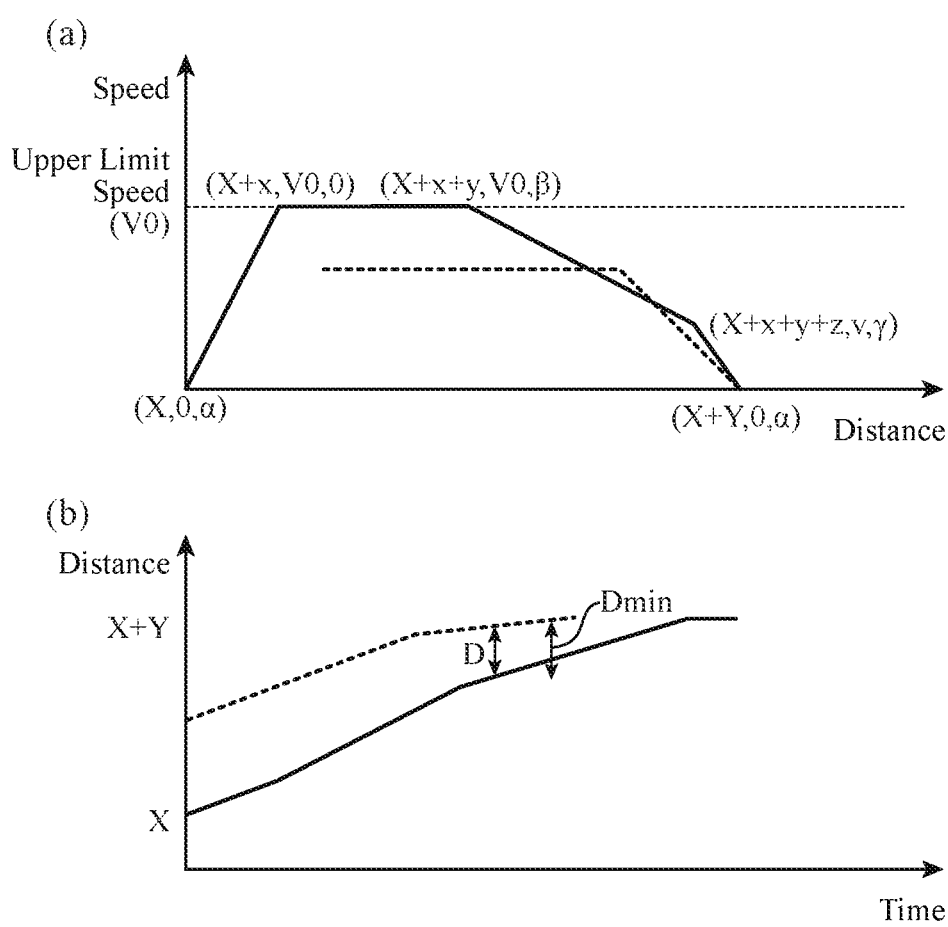
FIGS. 6(a) and 6(b) are graphs illustrating exemplary processing to determine necessity of correcting reference travel pattern in the driving assistance device according to the first embodiment.
Figure 7:
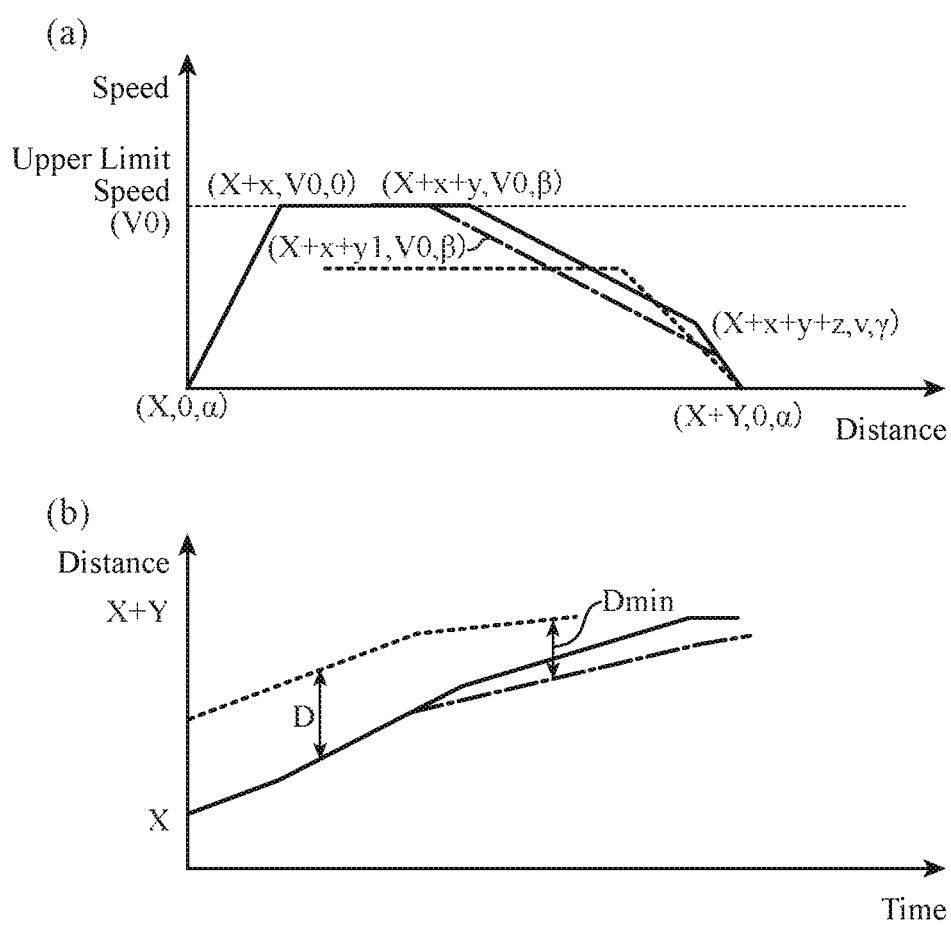
FIGS. 7(a) and 7(b) are graphs illustrating exemplary reference travel pattern correction processing of the driving assistance device according to the first embodiment.

In this regard, exemplary processing to determine the necessity of correction of the reference travel pattern will be described by using FIGS. 6(a) and 6(b). In the graph of FIG. 6(a), a solid line represents a reference travel pattern in a travel section closest to the own vehicle, and a dashed line represents a low fuel consumption travel pattern of a preceding vehicle received from the server device 200. The spot of the distance X+Y is set as the reference point in the same travel section of the own vehicle and the preceding vehicle, and the inter-vehicle distance D between the own vehicle and the preceding vehicle can be acquired by calculating a relative position of the preceding vehicle in the low fuel consumption travel pattern on the basis of the closest reference point of the own vehicle. As illustrated in FIG. 6(b), in the case where there exists a spot where the inter-vehicle distance D is shorter than the inter-vehicle distance Dmin while traveling from a current spot of the own vehicle to the above reference point, the travel pattern correction unit 17 determines that correction is necessary. On the other hand, in the case where there exists no spot where the inter-vehicle distance D is shorter than the inter-vehicle distance Dmin, the travel pattern correction unit 17 determines that correction is not necessary.

In the case where correction of the reference travel pattern is necessary based on the above-described examination (Step ST12: "YES"), the processing proceeds to Step ST13. In the case where correction is not necessary (Step ST12: "NO"), the processing proceeds to Step ST14.

In Step ST13, the travel pattern correction unit 17 corrects the reference travel pattern already generated for the own vehicle based on the low fuel consumption travel pattern of the preceding vehicle acquired in Step ST11.

In this regard, exemplary reference travel pattern correction processing will be described using FIGS. 7(a) to 8(b). In the graphs of FIGS. 7(a) to 8(b), a solid line represents the reference travel pattern already generated for the travel section closest to the own vehicle, a dot-and-dash line represents the corrected reference travel pattern, and a dashed line represents the low fuel consumption travel pattern of the preceding vehicle received from the server device 200.

In the example of FIGS. 7(a) and 7(b), correction is made such that the inter-vehicle distance D can be kept at the inter-vehicle distance Dmin or longer by expediting a deceleration start point of the own vehicle from the distance X+x+y to the distance X+x+y1 (y>y1). In this example, the stop position is adjusted so as to be the distance X+Y by adjusting switch timing between the deceleration β by engine brake and the deceleration γ by foot brake. However, considering a stop position of another vehicle, the stop position may be adjusted so as to be stopped short of another vehicle by a vehicle length.

In the example of FIGS. 8(a) and 8(b), in the case where the own vehicle is an electric vehicle (EV) or a hybrid electric vehicle (HEV) having a motor mounted as a drive source, correction is made such that the inter-vehicle distance D can be kept at the inter-vehicle distance Dmin or longer by changing deceleration from the deceleration β to the deceleration δ (β>δ) instead of expediting the deceleration start point. In the case of the EV or HEV, improvement of fuel consumption can be achieved by deceleration utilizing regenerative driving even when correction is made in this manner.

In Step ST14, the travel pattern correction unit 17 registers, in the history information storage unit 18, the reference travel pattern already generated for the own vehicle or the reference travel pattern corrected in Step ST13 as the low fuel consumption travel pattern.

Transmission processing (uploading) of the low fuel consumption travel pattern registered in the history information storage unit 18 to the server device 200 is performed at predetermined timing after the own vehicle starts traveling. For example, the transmission processing is repeatedly performed at the timing of generating the reference travel pattern at which guide is started after route setting, timing of correcting the reference travel pattern of the own vehicle based on the low fuel consumption travel pattern of another vehicle, or every time of entering the travel section on the travel route.

The travel pattern communication unit 15 transmits the low fuel consumption travel pattern in the travel section closest to the own vehicle, identification information that can identify the own vehicle, and identification information that can identify the reference point of the travel section all together. The identification information may be, for example, latitude/longitude information of the own vehicle and the reference point, and may also be an identification ID or the like that can uniquely identify the own vehicle and the reference point (e.g., signal stop line or intersection).

Furthermore, preferably, the low fuel consumption travel pattern is transmitted in a state of being sorted by an offset distance from a start reference point of a travel section. Consequently, it can be expected that the calculation processing in the server device 200 is simplified. Of course, the low fuel consumption travel pattern may also be sorted on the server device 200 side.

On the other hand, receiving processing (request) of the low fuel consumption travel pattern of another vehicle from the server device 200 is performed at predetermined timing after the own vehicle starts driving. For example, the receiving processing is performed at the timing of generating the reference travel pattern in which guide is started after route setting or at the timing of push notification from the server device 200. Additionally, the low fuel consumption travel pattern of another vehicle received from the server device 200 by the travel pattern communication unit 15 is the low fuel consumption travel pattern of the preceding vehicle in the travel section closest to the own vehicle.

Figure 9:
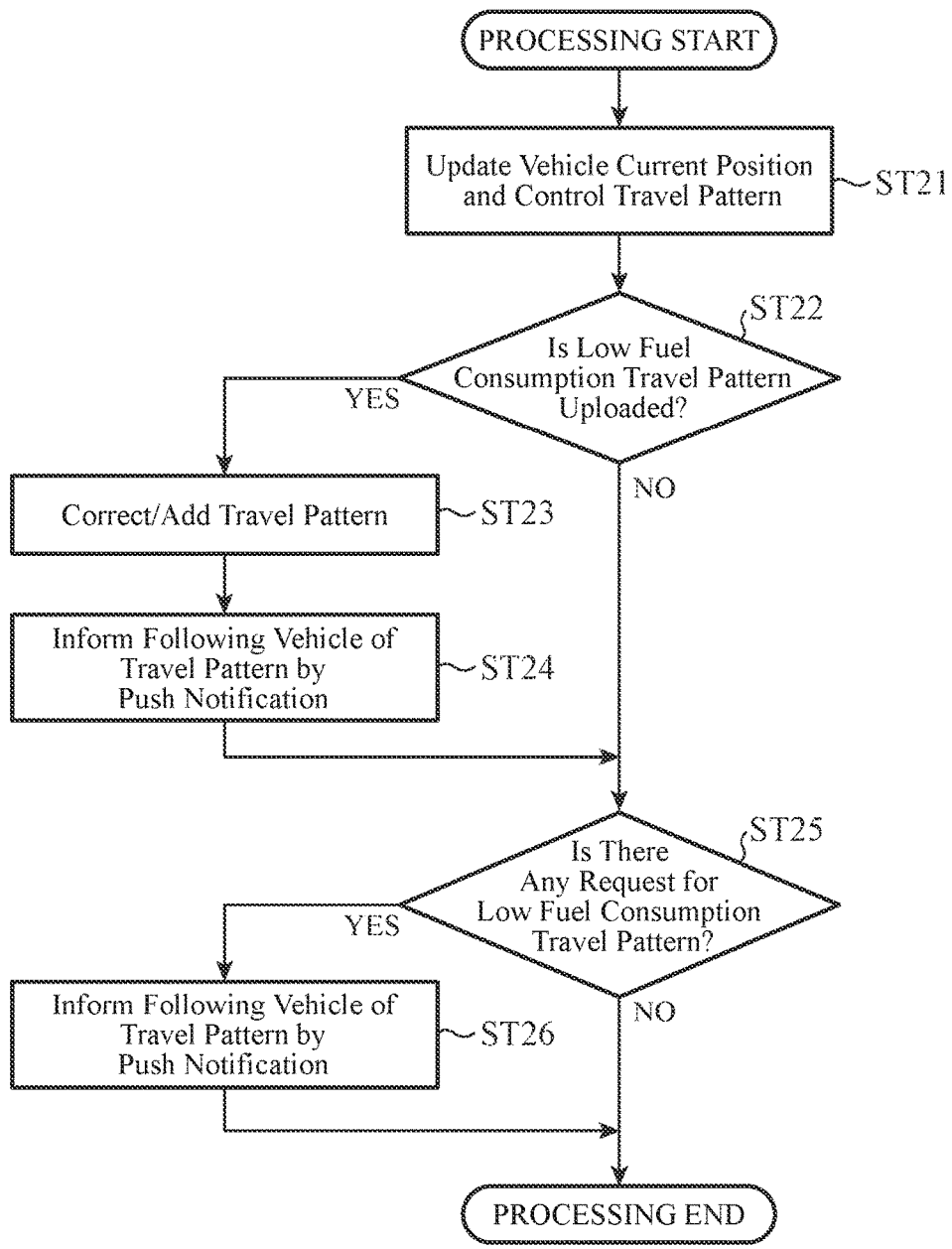
FIG. 9 is a flowchart illustrating exemplary calculation processing of a server device according to the first embodiment.

FIG. 9 is a flowchart illustrating operation of the server device 200 according to the first embodiment and also illustrating the calculation processing by the calculation processing unit 201. The calculation processing illustrated in FIG. 9 is performed at predetermined timing after the server device 200 is started. For example, the calculation processing is executed every predetermined period or every time the low fuel consumption travel pattern is uploaded or requested from the driving assistance device 100 via the mobile communication network 300.

First in Step ST21, the calculation processing unit 201 updates a current position of each vehicle per travel section stored in the accumulation unit 202. In the following, a description is provided assuming that low fuel consumption travel patterns of vehicles A to C are already accumulated in the accumulation unit 202. The low fuel consumption travel patterns of the vehicles A to C are the low fuel consumption travel patterns uploaded to the server device 200 by the driving assistance device 100 mounted on each of the vehicles A to C. For example, in the graph of FIG. 10, exemplified is a travel pattern in which the vehicle A is decelerated at a curve and stopped at a signal position of a reference point P2 in a travel section defined by a reference point P1 and the reference point P2. The vehicles B and C are driving ahead of the vehicle A.

The calculation processing unit 201 performs calculation in which each of the vehicles A to C is made to virtually travel for passage of a predetermined period based on the low fuel consumption travel patterns of the vehicles A to C, and the current positions of the vehicles A to C are updated. In this example, the current position of the vehicle A is updated to an updated distance X+x from a distance X before updated. In the same manner, the current positions of the vehicles B, C are updated to the distances Y, Z. Meanwhile, in the case of the low fuel consumption travel pattern in which an acceleration state is changed to a constant speed state, the calculation processing unit 201 updates only a section of the constant speed in the case where a section of acceleration ends. Furthermore, in the case where there is a vehicle advances outside a travel section, the calculation processing unit 201 deletes the low fuel consumption travel pattern of the vehicle from the travel section.

The calculation processing unit 201 controls the low fuel consumption travel patterns by causing the accumulation unit 202 to store the finally updated current positions and low fuel consumption travel patterns of the vehicles A to C.

Next, in Step ST22, the calculation processing unit 201 confirms whether the low fuel consumption travel pattern is uploaded from the driving assistance device 100 of each of the vehicles A to C or another vehicle via the mobile communication network 300. In the case where there exists the uploaded low fuel consumption travel pattern (Step ST22: "YES"), the processing proceeds to Step ST23. On the other hand, there exists no uploaded low fuel consumption travel pattern (Step ST22: "NO"), the processing proceeds to Step ST25.

At this point, design of an information route can be flexibly changed, for example, by once accumulating the uploaded low fuel consumption travel pattern in the accumulation unit 202 or the like.

In Step ST23, the calculation processing unit 201 updates the low fuel consumption travel pattern of each vehicle per travel section stored in the accumulation unit 202 based on the uploaded low fuel consumption travel pattern. More specifically, a travel section to be updated is specified from among the uploaded low fuel consumption travel patterns based on the reference point, and it is judged whether or not a travel pattern of the travel section already exists inside the accumulation unit 202. In the case where information of the low fuel consumption travel pattern already exists, the low fuel consumption travel pattern is replaced with the uploaded low fuel consumption travel pattern. In the case where the information of the low fuel consumption travel pattern does not exist in the accumulation unit 202, the current position of the vehicle is acquired based on a differential distance from the reference point, and the accumulation unit 202 is made to store the acquired information together with the uploaded low fuel consumption travel pattern.

In Step ST24, the calculation processing unit 201 informs, by the push notification, a driving assistance device 100 in a following vehicle of the low fuel consumption travel pattern updated in Step ST23. More specifically, the calculation processing unit 201 acquires, from the accumulation unit 202, the low fuel consumption travel pattern of each vehicle correlated to the updated travel section, specifies the vehicle existing behind, and informs information of the low fuel consumption travel pattern of the specified vehicle by the push notification.

Meanwhile, content of the push notification may be only the low fuel consumption travel pattern; however, information to identify the vehicle and the reference point may be added so as to be available for identification of the vehicle, confirmation of the reference point, and the like on a receiving vehicle side.

Figure 10:
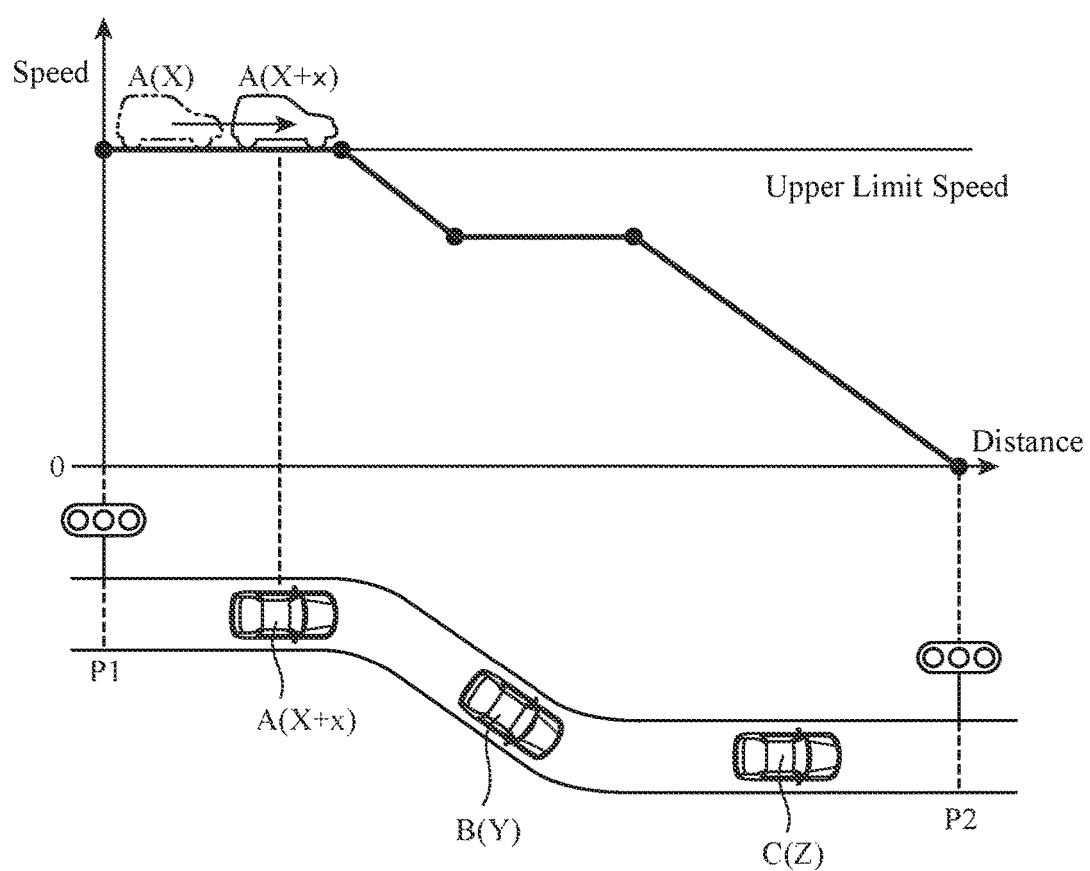
FIG. 10 is a graph illustrating exemplary calculation processing of the server device according to the first embodiment.

For example, in the case where the vehicle B uploads a low fuel consumption travel pattern in FIG. 10, the calculation processing unit 201 replaces the low fuel consumption travel pattern of the vehicle B stored in the accumulation unit 202 with the uploaded low fuel consumption travel pattern. Furthermore, the driving assistance device 100 in the vehicle A traveling behind the vehicle B is informed of the uploaded low fuel consumption travel pattern by the push notification.

Also, for example, in the case where a vehicle traveling ahead of the vehicle C (not illustrated) uploads a low fuel consumption travel pattern, the calculation processing unit 201 causes the accumulation unit 202 to store a current position and the low fuel consumption travel pattern of the vehicle. Additionally, the uploaded low fuel consumption travel pattern is informed, by the push notification, to the driving assistance device 100 of the vehicle C traveling behind the vehicle. The driving assistance device 100 of the vehicle C corrects the reference travel pattern of the own vehicle based on the low fuel consumption travel pattern informed by the push notification, and uploads the same to the server device 200. After the low fuel consumption travel pattern of the vehicle C is uploaded, the server device 200 informs the following vehicle B of the uploaded low fuel consumption travel pattern by the push notification. Therefore, the driving assistance device 100 of the vehicle B corrects the reference travel pattern of the own vehicle, and uploads the same to the server device 200. In the same manner, after the low fuel consumption travel pattern of the vehicle B is uploaded, the server device 200 informs the following vehicle A of the uploaded low fuel consumption travel pattern by the push notification, and the driving assistance device 100 of the vehicle A corrects the reference travel pattern of the own vehicle and uploads the same to the server device 200. Thus, the travel pattern of the following vehicle is corrected in accordance with the travel pattern of the vehicle traveling ahead.

In Step ST25, the calculation processing unit 201 confirms whether the low fuel consumption travel pattern is requested from the driving assistance devices 100 in each of the vehicles A to C or another vehicle via the mobile communication network 300. In the case where there exists a request (Step ST25: "YES"), the processing proceeds to Step ST26. On the other hand, in the case where there exists no request (Step ST25: "NO"), the processing ends.

At this point, design for how to handle information, such as once storing the request for the low fuel consumption travel pattern in the accumulation unit 202 and keeping the same in a queue, can be flexibly changed.

In Step ST26, the calculation processing unit 201 makes search for the low fuel consumption travel pattern of each vehicle per travel section stored in the accumulation unit 202 based on the request for the low fuel consumption travel pattern. More specifically, the calculation processing unit 201 first refers to the accumulation unit 202 and specifies, in the travel section corresponding to the request, a vehicle existing ahead of the vehicle that has made the request. Then, the calculation processing unit 201 acquires the low fuel consumption travel pattern of the specified vehicle from the accumulation unit 202 and informs the same by the push notification. For example, in the case where the vehicle B requests for the low fuel consumption travel pattern in FIG. 10, the calculation processing unit 201 specifies that the preceding vehicle is the vehicle C, and informs the driving assistance device 100 in the vehicle B of the travel pattern of the vehicle C stored in the accumulation unit 202 by the push notification.

Meanwhile, content of the push notification may be only the low fuel consumption travel pattern; however, information to identify the vehicle and the reference point may be added so as to be utilized on a receiving vehicle side for the identification of the vehicle, the confirmation of the reference point of the vehicle, and the like.

As described above, according to the first embodiment, the driving assistance device 100 is adapted to include: the traffic situation detection unit 11 to acquire the signal information and the like representing the indication schedule of the traffic signal; the vehicle information detection unit 12 to acquire the speed and the like of the own vehicle as the vehicle information; the current position specifying unit 13 to acquire the current position of the own vehicle as the current positional information; the travel route specifying unit 14 to acquire, as the travel route information, the spot where deceleration is required on the planned travel route along which the own vehicle travels; the history information storage unit 18 to store the vehicle information correlated to the current positional information as the history information; the travel pattern generation unit 16 to generate the travel pattern by acquiring the recommended speed when the own vehicle travels along the travel route based on the signal information, vehicle information, current positional information, travel route information, and history information; the travel pattern communication unit 15 to transmit the travel pattern of the own vehicle generated by the travel pattern generation unit 16 and receive the travel pattern of the preceding vehicle by communicating with the server device 200; the travel pattern correction unit 17 to correct the travel pattern of the own vehicle generated by the travel pattern generation unit 16 based on the travel pattern of the preceding vehicle received from the server device 200 by the travel pattern communication unit 15; and the information providing unit 19 to provide the own vehicle with the travel pattern of the own vehicle generated by the travel pattern generation unit 16 or corrected by the travel pattern correction unit 17. Therefore, the low fuel consumption travel pattern in accordance with a shape of the travel route and traffic situations at the time of traveling can be generated. Furthermore, since the travel pattern of the own vehicle is corrected considering the travel pattern of the preceding vehicle, driving assistance in accordance with the situations of surrounding vehicles can be provided, and fuel consumption can be improved.

Furthermore, the driving assistance device 100 is adapted to generate, based on the various acquired information, the travel pattern that enables the own vehicle to perform eco-driving, and transmit the generated travel pattern to the server device 200 on a network, and also receive the travel pattern of the preceding vehicle, and correct the travel pattern of the own vehicle. Therefore, in the case of using this driving assistance device 100, a travel pattern database can be built in the server device 200 based on the travel patterns transmitted from a plurality of vehicles. Therefore, there is no need to repeatedly detect the speed of the preceding vehicle with a sensor mounted on the own vehicle and autonomously generate the travel pattern. Therefore, a calculation amount for generating and correcting the travel pattern can be significantly reduced.

Meanwhile, the driving assistance device 100 of the first embodiment is adapted to recognize existence of another vehicle based on the travel pattern received via the travel pattern communication unit 15 and correct the travel pattern of the own vehicle. However, in the case where existence of a preceding vehicle is autonomously detected by the traffic situation detection unit 11, the travel pattern may be corrected by using the detected information. In the case of this configuration, as for the preceding vehicle existing in a long distance where autonomous detection cannot be performed by the traffic situation detection unit 11, the travel pattern correction unit 17 corrects the travel pattern of the own vehicle based on the travel pattern received from the server device 200, and then a speed of the travel pattern is interpolated based on detected information of the traffic situation detection unit 11 so as to keep a constant inter-vehicle distance between the own vehicle and the preceding vehicle existing in a near distance where autonomous detection can be performed by the traffic situation detection unit 11.

Further, according to the first embodiment, in the case where the travel pattern of the own vehicle generated by the travel pattern generation unit 16 interferes with the travel pattern of the preceding vehicle received by the travel pattern communication unit 15, the travel pattern correction unit 17 is adapted to perform correction such that the travel pattern of the own vehicle does not interfere therewith. Therefore, eco-driving can be secured.

Furthermore, according to the first embodiment, the travel pattern correction unit 17 is adapted to correct the travel pattern of the own vehicle such that the inter-vehicle distance becomes the threshold or longer in the case where the inter-vehicle distance between the own vehicle and the preceding vehicle is shorter than the threshold based on the travel pattern of the own vehicle generated by the travel pattern generation unit 16 and the travel pattern of the preceding vehicle received by the travel pattern communication unit 15. As a result, it is possible to avoid a situation in which the own vehicle approaches too close to the preceding vehicle and cannot perform eco-driving.

Moreover, according to the first embodiment, the history information storage unit 18 stores the threshold of the inter-vehicle distance in accordance with the driving characteristics of the driver of the own vehicle acquired from the history information, and the travel pattern correction unit 17 is adapted to determine necessity of correcting the travel pattern of the own vehicle based on the threshold stored in the history information storage unit 18. This can assist eco-driving in accordance with the driving characteristics of the driver.

Moreover, according to the first embodiment, in the case where the own vehicle is a vehicle having the motor mounted as the drive source, the travel pattern correction unit 17 is adapted to correct the travel pattern of the own vehicle considering deceleration by regenerative driving. Therefore, fuel consumption can be improved by regenerative driving.

Furthermore, according to the first embodiment, the history information storage unit 18 stores acceleration and deceleration in accordance with the characteristics of the own vehicle acquired from the history information, and the travel pattern generation unit 16 is adapted to generate the travel pattern of the own vehicle based on the acceleration and deceleration stored in the history information storage unit 18. This can generate the highly accurate travel pattern in accordance with vehicle characteristics, and can secure highly accurate eco-driving.

Additionally, according to the first embodiment, the travel pattern communication unit 15 is adapted to perform transmission of the travel pattern of the own vehicle and receipt of the travel pattern of the preceding vehicle every time the own vehicle enters the travel section set on the travel route. Therefore, when the travel pattern is corrected, the travel pattern of the preceding vehicle can be referenced only in the closest travel section to the own vehicle where the own vehicle is likely to be affected by existence of the preceding vehicle. As a result, calculation efficiency in correction can be improved. Further, highly accurate eco-driving can be achieved. Meanwhile, the travel section represents a section in which spots where deceleration is required, such as a stop line and a curve, are set as a start point and an end point.

Furthermore, according to the first embodiment, in the case where the travel pattern correction unit 17 has corrected the travel pattern of the own vehicle, the travel pattern communication unit 15 is adapted to perform transmission of the travel pattern of the own vehicle and receipt of the travel pattern of the preceding vehicle every time the own vehicle enters the travel section set on the travel route. Therefore, the following vehicle existing behind the own vehicle can promptly correct the travel pattern, considering the corrected travel pattern of the own vehicle, and eco-driving can be secured.

Moreover, according to the first embodiment, the travel pattern communication unit 15 is adapted to receive the travel pattern of the preceding vehicle from the server device 200 in the event of at least one of following cases: the travel pattern of the preceding vehicle is generated; and the travel pattern of the preceding vehicle is corrected. Therefore, the travel pattern generated or corrected in the preceding vehicle is instantaneously received, the travel pattern of the own vehicle can be promptly corrected, and eco-driving can be secured.

Second Embodiment

Figure 11:
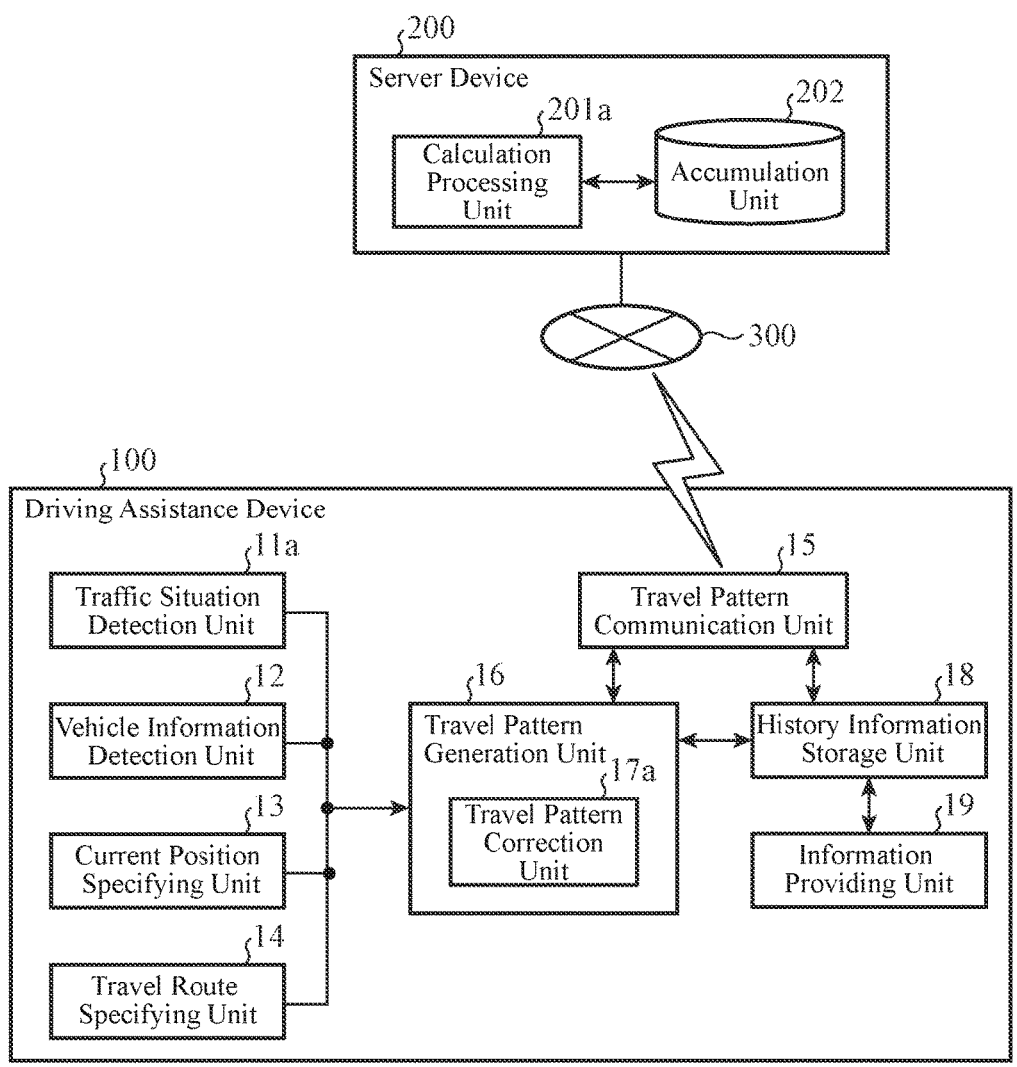
FIG. 11 is a block diagram illustrating a driving assistance system including a driving assistance device according to a second embodiment.

FIG. 11 is a block diagram illustrating a driving assistance system according to a second embodiment. In FIG. 11, components same as or equivalent to the ones in FIG. 1 are denoted by same reference numbers, and a description therefor will be omitted. A traffic situation detection unit 11a of a driving assistance device 100 according to the second embodiment acquires lane information indicating a lane where an own vehicle travels in addition to signal state information representing indication schedule of a traffic signal, traffic jam state information, and the like.

Figure 12:
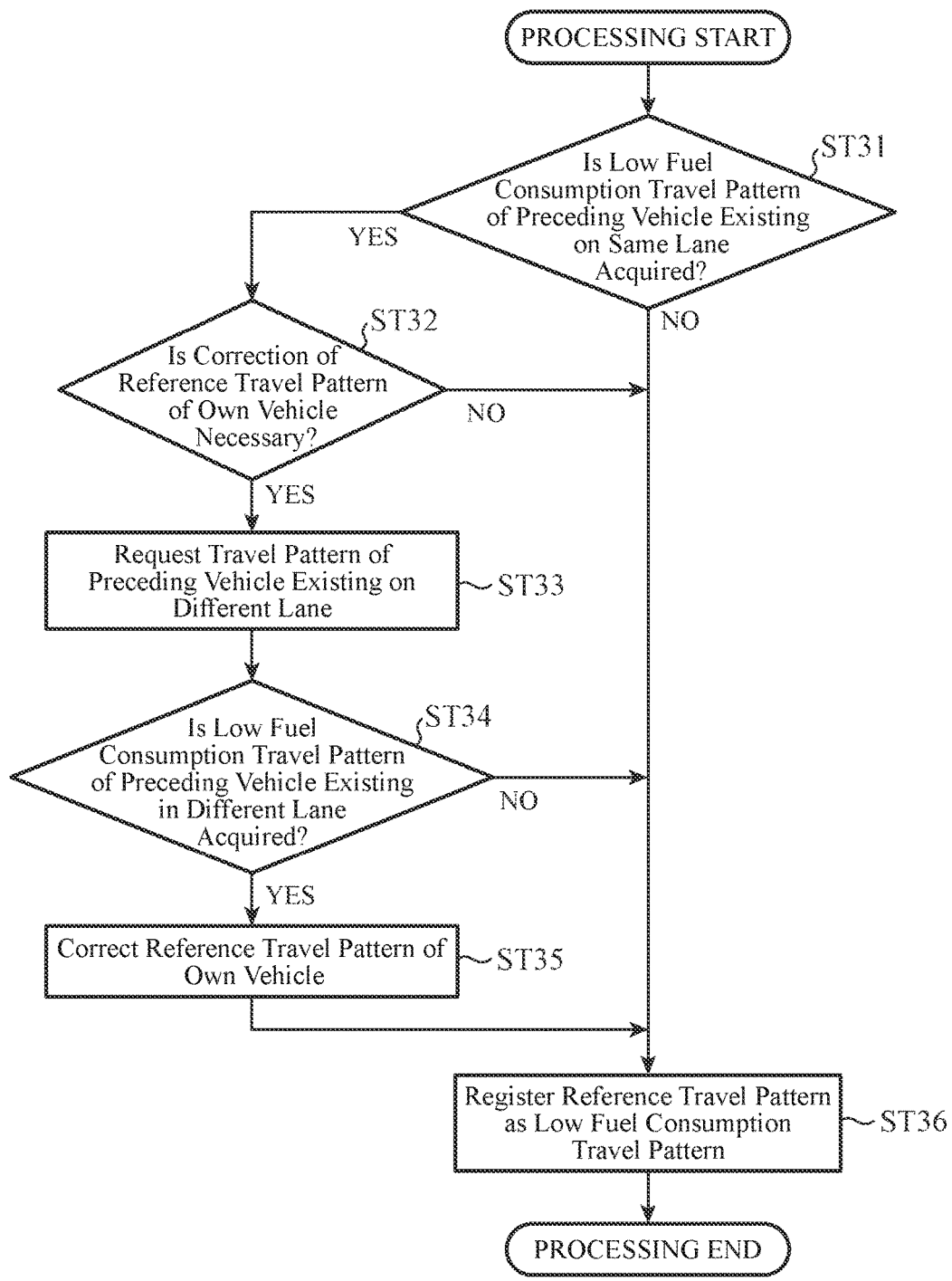
FIG. 12 is a flowchart illustrating exemplary reference travel pattern correction processing of the driving assistance device according to the second embodiment.

FIG. 12 is a flowchart illustrating exemplary operation of the driving assistance device 100 according to the second embodiment, and also illustrating reference travel pattern correction processing by a travel pattern correction unit 17a. The reference travel pattern correction processing illustrated in FIG. 12 is performed at the timing same as reference travel pattern generation processing, and further repeatedly performed after the reference travel pattern generation processing. Also, the reference travel pattern correction processing may be executed at the timing when a travel pattern communication unit 15 receives information of a low fuel consumption travel pattern of a preceding vehicle from a server device 200 or at the timing when the traffic situation detection unit 11a detects lane change of the own vehicle.

First, in Step ST31, the travel pattern correction unit 17a confirms whether the low fuel consumption travel pattern of the preceding vehicle existing in the same lane can be acquired from the travel pattern communication unit 15. In the case where the low fuel consumption travel pattern can be acquired (Step ST31: "YES"), the processing proceeds to Step ST32. On the other hand, in the case where the low fuel consumption travel pattern cannot be acquired (Step ST31: "NO"), the processing proceeds to Step ST36.

Next, in Step ST32, the travel pattern correction unit 17a examines necessity of correcting the reference travel pattern already generated for the own vehicle based on the low fuel consumption travel pattern of the preceding vehicle existing on the same lane acquired in Step ST31. Since an example of determining necessity of correction has been described in FIG. 6, a description therefor will be omitted.

In the case of determining that correction is necessary through above-described examination (Step ST32: "YES"), the processing proceeds to Step ST33. In the case where there is no need for correction (Step ST32: "NO"), the processing proceeds to Step ST36.

In Step ST33, the travel pattern correction unit 17a transmits, to the server device 200, a request for the low fuel consumption travel pattern of the preceding vehicle existing on a different lane via the travel pattern communication unit 15. More specifically, the request is transmitted while the lane information indicating a desired lane is correlated to a travel section, a traveling position, and the traveling lane where the own vehicle exists. For example, assuming that three lanes are named as L1 to L3 from a leftmost lane, when the traveling lane of the own vehicles is the lane L1, the desired lane information is determined as the Lane L2, and when the traveling lane of the own vehicle is the lane L2, the desired lane information is determined as the lanes L1 and L3.

Next, in Step ST34, the travel pattern correction unit 17a confirms whether the low fuel consumption travel pattern of the preceding vehicle existing on the different lane can be acquired from the travel pattern communication unit 15. In the case where the low fuel consumption travel pattern can be acquired (Step ST34: "YES"), the processing proceeds to Step ST35. On the other hand, in the case where the low fuel consumption travel pattern cannot be acquired (Step ST34: "NO"), the processing proceeds to Step ST36.

In Step ST35, the travel pattern correction unit 17a examines necessity of correcting the reference travel pattern already generated for the own vehicle based on the low fuel consumption travel pattern of the preceding vehicle on the different lane acquired in Step ST34. For example, in the case of determining that there is no necessity to change the reference travel pattern already generated for the own vehicle because the traveling lane of the own vehicle is changed to the different lane, the travel pattern correction unit 17a makes correction to correlated the reference travel pattern of the own vehicle to the lane information as changed. Furthermore, in the case of determining that changing a lane gives less influence than correcting the reference travel pattern without changing the lane, the travel pattern correction unit 17a correlates the reference travel pattern of the own vehicle to the lane information as changed, and then corrects the reference travel pattern of the own vehicle based on the low fuel consumption travel pattern of the preceding vehicle existing in the changed lane.

On the other hand, in the case not applicable to the above case, the travel pattern correction unit 17a does not change the lane information and corrects the reference travel pattern of the own vehicle based on the low fuel consumption travel pattern of the preceding vehicle existing in the same lane acquired in Step ST31.

Meanwhile, since an example of reference travel pattern correction processing has been described in FIGS. 7(a) to 8(b), a description therefor will be omitted here.

In Step ST36, the travel pattern correction unit 17a registers, as the low fuel consumption travel pattern, the reference travel pattern already generated for the own vehicle or the reference travel pattern corrected in Step ST35 in the history information storage unit 18.

Transmission processing (uploading) of the low fuel consumption travel pattern registered in the history information storage unit 18 to the server device 200 is performed at the timing same as the first embodiment. Furthermore, when the traffic situation detection unit 11a can detect lane change of the own vehicle by recognizing processing at a road white line or the like, the transmission processing may also be performed after updating the lane information at the timing of detecting lane change in addition to the timing same as the first embodiment.

The travel pattern communication unit 15 transmits the lane information together with the low fuel consumption travel pattern in a travel section closest to the own vehicle, identification information that can specify the own vehicle, and identification information that can specify a reference point of the travel section.

On the other hand, receiving processing (request) of the low fuel consumption travel pattern of another vehicle from the server device 200 is executed at the timing same as the first embodiment. Furthermore, when the traffic situation detection unit 11a can detect lane change of the own vehicle, the receiving processing may also be performed after updating the lane information at the timing of detecting lane change in addition to the timing same as the first embodiment.

As described in FIG. 12, the low fuel consumption travel pattern received by the travel pattern communication unit 15 is not limited to only the same lane but also includes the low fuel consumption travel pattern of the preceding vehicle on the different lane in the travel section closest to the own vehicle.

The information providing unit 19 not only provides information of the low fuel consumption travel pattern stored in the history information storage unit 18 and assists a driver to perform low fuel consumption travel, but in the case where the lane information correlated to the low fuel consumption travel pattern is changed, the information providing unit 19 also provides such changed information and assists the driver to perform lane change. Eco-driving can be secured by changing the lane in response to the above assistances.

In the server device 200, an accumulation unit 202 stores the low fuel consumption travel pattern of each vehicle per traveling lane, thereby controlling information.

Figure 13:
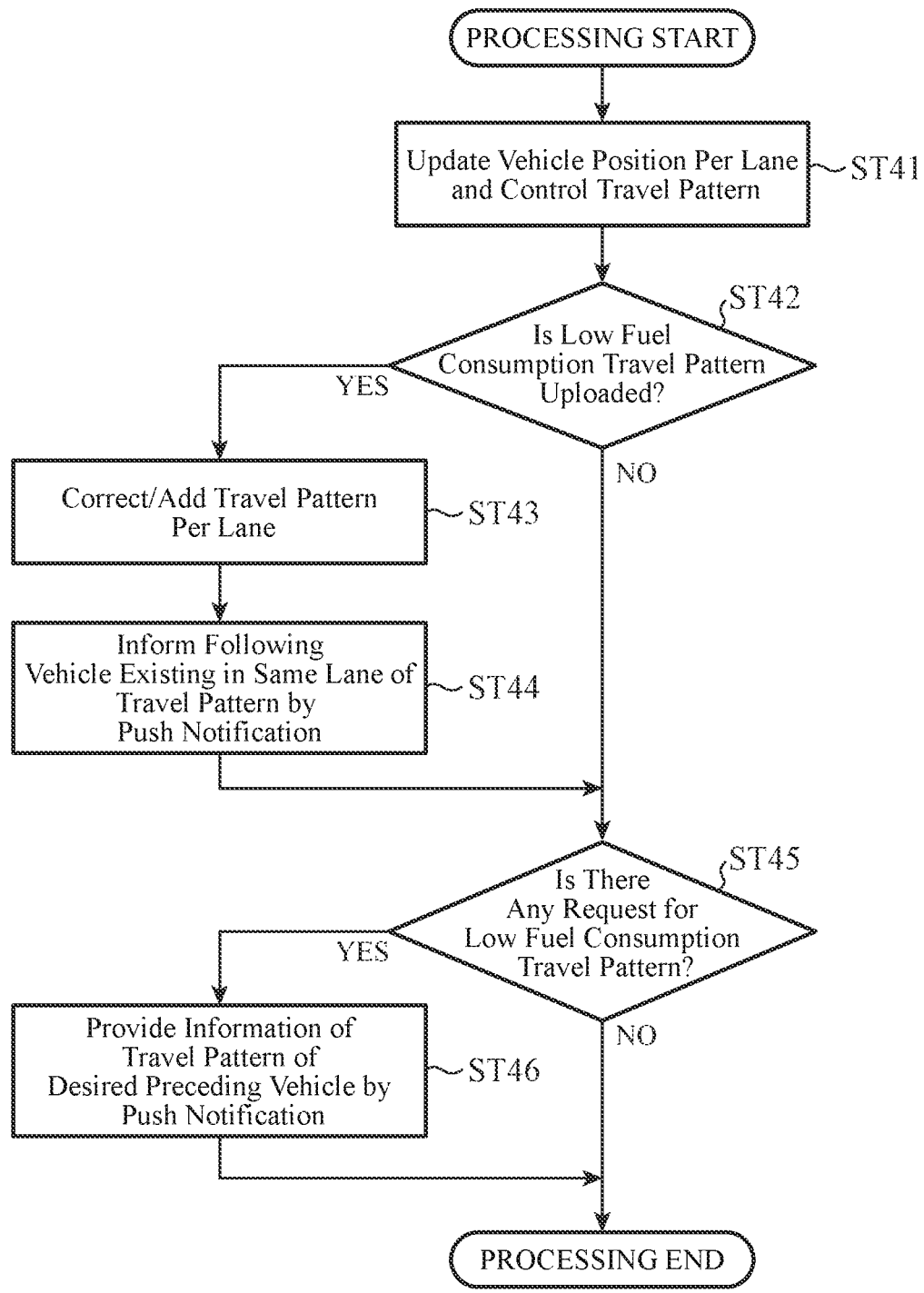
FIG. 13 is a flowchart illustrating exemplary calculation processing of a server device according to the second embodiment.

FIG. 13 is a flowchart illustrating operation of the server device 200 according to the second embodiment, and also illustrating calculation processing by the calculation processing unit 201a. The calculation processing illustrated in FIG. 13 is executed at the same timing as the first embodiment.

First, in Step ST41, the calculation processing unit 201a updates a current position of each vehicle per travel section and per traveling lane stored in the accumulation unit 202. Since this operation is same as Step ST21 in FIG. 9, a description therefor will be omitted.

Next, in Step ST42, the calculation processing unit 201a confirms whether the low fuel consumption travel pattern is uploaded from the driving assistance devices 100 mounted in the vehicle via a mobile communication network 300. In the case where there exists the uploaded low fuel consumption travel pattern (Step ST42: "YES"), the processing proceeds to Step ST43. On the other hand, there exists no uploaded low fuel consumption travel pattern (Step ST42: "NO"), the processing proceeds to Step ST45.

In Step ST43, the calculation processing unit 201a updates the low fuel consumption travel pattern of each vehicle per travel section and per traveling lane stored in the accumulation unit 202 based on the uploaded low fuel consumption travel pattern. Basic operation is the same as Step ST23 in FIG. 9, but in Step ST43, the calculation processing unit 201a refers to the lane information as well, and in the case where the lane information is changed, the low fuel consumption travel pattern stored in the accumulation unit 202 is replaced with the uploaded low fuel consumption travel pattern.

In Step ST44, the calculation processing unit 201a informs a driving assistance device 100 in a following vehicle of the low fuel consumption travel pattern updated in Step ST43 by push notification. More specifically, the calculation processing unit 201a acquires, from the accumulation unit 202, the low fuel consumption travel pattern of each vehicle correlated to the updated travel section and traveling lane, specifies the vehicle existing behind, and informs the low fuel consumption travel pattern of the specified vehicle by the push notification. For example, in the graph of FIG. 10, exemplified is a travel pattern in which a vehicle A traveling on the lane L2 decelerates at a curve and stops at a signal position of a reference point P2 within a travel section defined by a reference point P1 and the reference point P2. A vehicle B travels ahead of the vehicle A on the same lane L2, and a vehicle C travels ahead on the different lane L3. In the case where the low fuel consumption travel pattern updated in Step ST43 is that of the vehicle B in this situation, the calculation processing unit 201a specifies that the vehicle A existing on the same lane L2 is the following vehicle, and informs the driving assistance device 100 in the vehicle A of the low fuel consumption travel pattern of the vehicle B by the push notification.

Meanwhile, content of the push notification may be only the lane information and the low fuel consumption travel pattern, but information to identify the vehicle and the reference point may also be added in the same manner as the first embodiment.

In Step ST45, the calculation processing unit 201a confirms whether the low fuel consumption travel pattern and the lane information are requested from the driving assistance devices 100 of the vehicles A to C or another vehicle via the mobile communication network 300. In the case where there exists a request (Step ST45: "YES"), the processing proceeds to Step ST46. On the other hand, in the case where there exists no request (Step ST45: "NO"), the processing ends.

Figure 14:
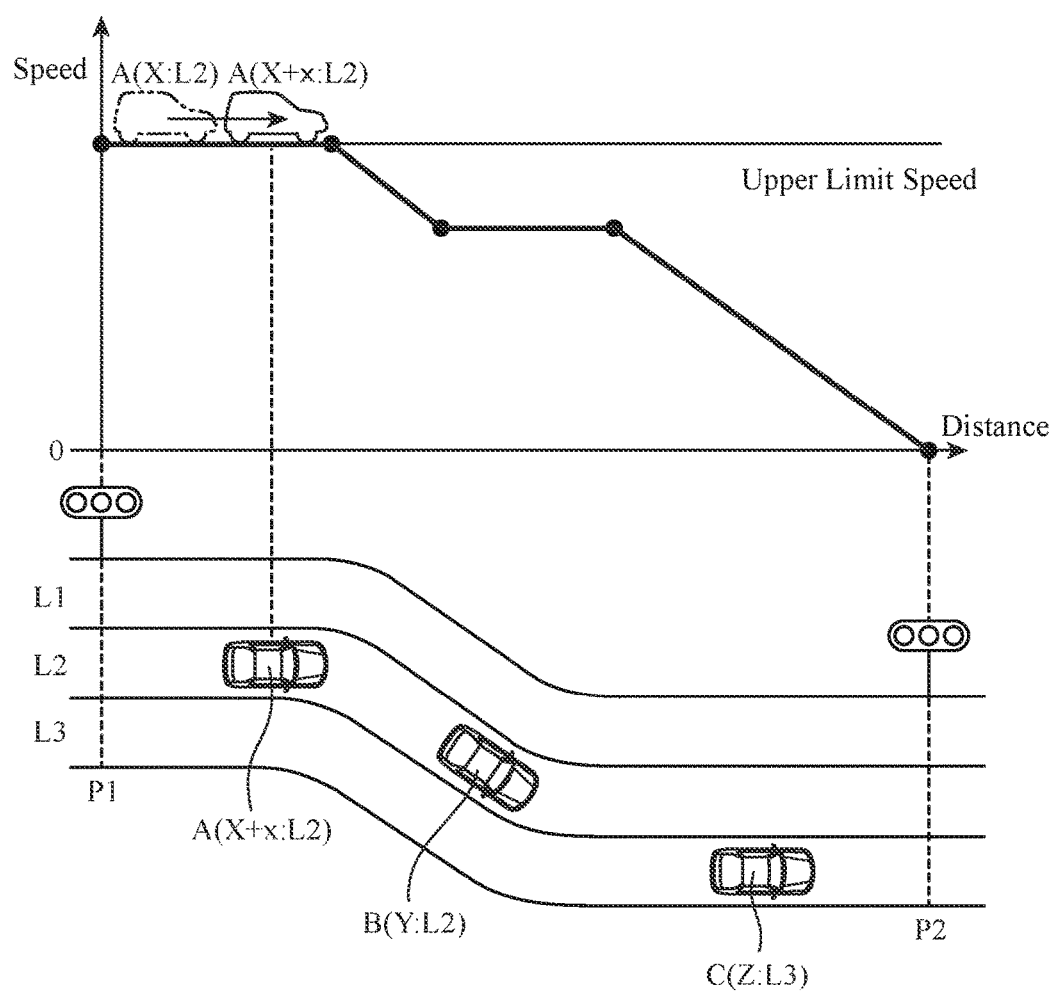
FIG. 14 is a graph illustrating exemplary calculation processing of the server device according to the second embodiment.

In Step ST46, the calculation processing unit 201a makes a search for the low fuel consumption travel pattern of each vehicle per the travel section and per the traveling lane stored in the accumulation unit 202 based on the request for the low fuel consumption travel pattern and the lane information. The calculation processing unit 201a specifies the vehicle that has made the request and exists ahead in the travel section and the traveling lane corresponding to the request, and acquires the low fuel consumption travel pattern of the specified vehicle from the accumulation unit 202, and then provides the acquired information by the push notification. For example, in the case where the vehicle B makes a request for the low fuel consumption travel patterns relative to the lanes L1 and L3 in FIG. 14, the calculation processing unit 201a specifies that the preceding vehicle is the vehicle C traveling on the lane L3, and informs the driving assistance device 100 in the vehicle B, by the push notification, of the low fuel consumption travel pattern of the vehicle C stored correlated to the information of the lane L3 in the accumulation unit 202.

Meanwhile, content of the push notification may be only the lane information and the low fuel consumption travel pattern, but information to identify the vehicle and the reference point may also be added in the same manner as the first embodiment.

As described above, according to the second embodiment, the traffic situation detection unit 11a acquires the lane information representing the lane where the own vehicle travels, the travel pattern communication unit 15 transmits the travel pattern of the own vehicle generated by the travel pattern generation unit 16 with correlated to the lane information acquired by the traffic situation detection unit 11a, and receives the travel pattern and the lane information of the preceding vehicle, and the travel pattern correction unit 17a is adapted to correct the travel pattern of the own vehicle based on the travel pattern of the preceding vehicle existing on the lane same as the own vehicle. Therefore, unnecessary correction based on the travel pattern of the preceding vehicle existing on the different lane can be avoided, and highly accurate eco-driving can be performed based on existence of only the preceding vehicle existing on the same lane.

Furthermore, according to the second embodiment, the travel pattern correction unit 17a is adapted to make correction to change the lane on which the own vehicle travels to the different lane in the case where an inter-vehicle distance between the own vehicle and the preceding vehicle existing on the same lane is shorter than a threshold and also in the case where the inter-vehicle distance between the own vehicle and the preceding vehicle existing on the different lanes is the threshold or longer based on the travel pattern and the lane information of the own vehicle and the travel pattern and the lane information of the preceding vehicle. Therefore, highly accurate eco-driving can be performed considering lane change.

Furthermore, according to the second embodiment, the travel pattern communication unit 15 is adapted to perform transmission of the travel pattern of the own vehicle and receipt of the travel pattern of the preceding vehicle in the case where the own vehicle changes the lane. Therefore, the travel pattern of the preceding vehicle after the lane change of the own vehicle can be corrected, and also the travel pattern of the following vehicle of the own vehicle can also be corrected considering the travel pattern after the lane change of the own vehicle. As a result, eco-driving can be secured.

Meanwhile, according to the second embodiment, the travel pattern correction unit 17a is adapted to determine necessity of correction based on the travel pattern of the preceding vehicle existing on the same lane, and in the case of determining that correction is necessary, the request for the travel pattern of the preceding vehicle existing on the different lane is made via the travel pattern communication unit 15, but not limited thereto. For example, in the case where the server device 200 performs push notification after specifying the following vehicle in accordance with lane change of another vehicle and the like and performs push notification (Step ST44 in FIG. 13), the vehicle specified as a notification target may be urged to determine necessity to change a lane by providing the push notification together with the travel pattern of the vehicle existing on the different lane.

Furthermore, it may be configured that in the case where the traffic situation detection unit 11a autonomously detects a stopped vehicle (or a breakdown vehicle) or traffic jam ahead of the own vehicle, a position of the detected stopped car or the like is calculated based on a relative distance from a current position of the own vehicle, and that the calculated information is transmitted to the server device 200 together with the travel pattern. Additionally, in the case where the traffic situation detection unit 11a detects the stopped car or traffic jam ahead of the own vehicle and detects later that the problems are resolved, such information may be transmitted to the server device 200 together with the travel pattern. In the case of this configuration, the server device 200 informs the driving assistance device 100 in the following vehicle of such information by the push notification, thereby enabling the driving assistance device 100 in the following vehicle to change the lane beforehand so as to avoid the stopped vehicle or the traffic jam. As a result, eco-driving can be secured.

Meanwhile, in the present invention, the respective embodiments can be freely combined, any component in the respective embodiments can be modified, or any component in the respective embodiments can be omitted within the scope of the present invention.

INDUSTRIAL APPLICABILITY

Since the driving assistance device according to the present invention provides a travel pattern considering situations of the surrounding vehicles, the driving assistance device is suitable for a driving assistance device to perform low fuel consumption travel.

DESCRIPTION OF REFERENCE NUMERALS AND SIGNS 11, 11a Traffic Situation Detection Unit
12 Vehicle Information Detection Unit
13 Current Position Specifying Unit
14 Travel Route Specifying Unit
15 Travel Pattern Communication Unit
16 Travel Pattern Generation Unit
17, 17a Travel Pattern Correction Unit
18 History Information Storage Unit
19 Information Providing Unit
100 Driving assistance device
200 Server Device
201, 201a Calculation Processing Unit
202 Accumulation Unit
300 Mobile Communication Network
A-C Vehicle
L1-L3 Lane
P1, P2 Reference Point

The invention claimed is:

1. A driving assistance device, comprising:
a traffic situation detector to acquire signal information representing indication schedule of a traffic signal;
a vehicle speed detector to acquire a speed of an own vehicle as information;
a current position detector to acquire a current position of the own vehicle as current positional information;
a travel route generator to acquire, as travel route information, a spot where deceleration is required on a planned travel route along which the own vehicle travels;
a history information storage to store, as history information, the vehicle information correlated to the current positional information;
a travel pattern generator to generate a travel pattern by acquiring a recommended speed when the own vehicle travels along the travel route based on the signal information, the vehicle information, the current positional information, the travel route information, and the history information;
a travel pattern communicator to transmit the travel pattern of the own vehicle generated by the travel pattern generator and receive a travel pattern of a preceding vehicle of the own vehicle by communicating with a server device;
a travel pattern corrector to correct the travel pattern of the own vehicle generated by the travel pattern generator based on the travel pattern of the preceding vehicle received by the travel pattern communicator from the server device; and
an information provider to provide the own vehicle with the travel pattern of the own vehicle generated by the travel pattern generator or corrected by the travel pattern corrector.

2. The driving assistance device according to claim 1, wherein in a case where the travel pattern of the own vehicle generated by the travel pattern generator interferes with the travel pattern of the preceding vehicle received by the travel pattern communicator, the travel pattern corrector performs correction such that the travel pattern of the own vehicle does not interfere.

3. The driving assistance device according to claim 2, wherein in a case where an inter-vehicle distance between the own vehicle and the preceding vehicle is shorter than a threshold based on the travel pattern of the own vehicle generated by the travel pattern generator and the travel pattern of the preceding vehicle received by the travel pattern communicator, the travel pattern corrector corrects the travel pattern of the own vehicle such that the inter-vehicle distance becomes the threshold or longer.

4. The driving assistance device according to claim 3, wherein the history information storage stores a threshold of an inter-vehicle distance in accordance with driving characteristics of a driver of the own vehicle acquired from the history information, and the travel pattern corrector determines necessity to correct the travel pattern of the own vehicle based on the threshold stored in the history information storage.

5. The driving assistance device according to claim 3, wherein in a case where the own vehicle is a vehicle having a motor mounted as a drive source, the travel pattern corrector corrects the travel pattern of the own vehicle considering deceleration by regenerative driving.

6. The driving assistance device according to claim 1, wherein the history information storage stores acceleration and deceleration in accordance with characteristics of the own vehicle acquired from the history information, and the travel pattern generator generates the travel pattern of the own vehicle based on the acceleration and the deceleration stored in the history information storage.

7. The driving assistance device according to claim 1, wherein the travel pattern communicator performs transmission of the travel pattern of the own vehicle and receipt of the travel pattern of the preceding vehicle every time the own vehicle enters a travel section set on the travel route.

8. The driving assistance device according to claim 7, wherein in a case where the travel pattern corrector corrects the travel pattern of the own vehicle, the travel pattern communicator performs transmission of the corrected travel pattern of the own vehicle and receipt of the travel pattern of the preceding vehicle every time the own vehicle enters the travel section.

9. The driving assistance device according to claim 7, wherein the travel pattern communicator receives a travel pattern of the preceding vehicle from the server device in the event of at least one of cases where: the travel pattern of the preceding vehicle is generated; and the travel pattern of the preceding vehicle is corrected.

10. The driving assistance device according to claim 7, wherein the travel pattern communicator performs transmission of the travel pattern of the own vehicle and receipt of the travel pattern of the preceding vehicle in the event of at least one of cases where: the travel pattern generator generates the travel pattern of the own vehicle; the own vehicle changes a lane; traffic jam or a stopped vehicle is detected ahead of the own vehicle; and resolution of the detected traffic jam or the detected stopped vehicle is detected.

11. The driving assistance device according to claim 1, wherein
the traffic situation detector acquires lane information representing a lane where the own vehicle travels,
the travel pattern communicator transmits the travel pattern of the own vehicle generated by the travel pattern generator with correlated to the lane information acquired by the traffic situation detector, and receives a travel pattern and lane information of the preceding vehicle, and the travel pattern corrector corrects the travel pattern of the own vehicle based on the travel pattern of the preceding vehicle existing on a lane same as the own vehicle.

12. The driving assistance device according to claim 11, wherein the travel pattern corrector performs correction to change the lane where the own vehicle travels to a different lane in a case where an inter-vehicle distance between the own vehicle and the preceding vehicle existing on the same lane is shorter than a threshold and also in a case where an inter-vehicle distance between the own vehicle and a preceding vehicle existing on a different lanes is the threshold or longer based on the travel pattern and the lane information of the own vehicle and the travel pattern and the lane information of the preceding vehicle.

13. A driving assistance method of a driving assistance device to provide a travel pattern of an own vehicle, comprising:
- acquiring a recommended speed when the own vehicle travels a travel route and generating a travel pattern;
- transmitting the generated travel pattern of the own vehicle and receiving a travel pattern of a preceding vehicle of the own vehicle by communicating with a server device;
- correcting the generated travel pattern of the own vehicle based on the travel pattern of the preceding vehicle received from the server device; and
- providing the own vehicle with the generated or corrected travel pattern of the own vehicle.

* * * * *